US012795264B2

(12) United States Patent
Xhakoni

(10) Patent No.: US 12,795,264 B2
(45) Date of Patent: Nov. 10, 2026

(54) PIXEL ARRANGEMENT AND METHOD FOR OPERATING A PIXEL ARRANGEMENT

(71) Applicant: AMS SENSORS BELGIUM BV, Antwerp (BE)

(72) Inventor: Adi Xhakoni, Kessel-Lo (BE)

(73) Assignee: ams Sensors Belgium BV, Antwerp (BE)

( * ) Notice: Subject to any disclaimer, the term of this patent is extended or adjusted under 35 U.S.C. 154(b) by 0 days.

(21) Appl. No.: 19/125,319

(22) PCT Filed: Oct. 30, 2023

(86) PCT No.: PCT/EP2023/080219
§ 371 (c)(1),
(2) Date: Apr. 29, 2025

(87) PCT Pub. No.: WO2024/094611
PCT Pub. Date: May 10, 2024

(65) Prior Publication Data

US 2026/0172718 A1 Jun. 18, 2026

(30) Foreign Application Priority Data

Nov. 3, 2022 (DE) ..................... 10 2022 129 039.5

(51) Int. Cl.
*H04N 25/78* (2023.01)
*H04N 25/51* (2023.01)
(Continued)

(52) U.S. Cl.
CPC ............. *H04N 25/78* (2023.01); *H04N 25/51* (2023.01); *H04N 25/583* (2023.01);
(Continued)

(58) Field of Classification Search
CPC .... H04N 25/77; H04N 25/771; H04N 25/772; H04N 25/51; H04N 25/57; H04N 25/58;
(Continued)

(56) References Cited

U.S. PATENT DOCUMENTS 10,103,193 B1 * 10/2018 Manabe ................ H10F 39/014
11,343,450 B1 5/2022 Hasegawa
(Continued)

FOREIGN PATENT DOCUMENTS

CN 102833495 A * 12/2012 ............. H04N 25/60
CN 108470742 A 8/2018
(Continued)

OTHER PUBLICATIONS

International Search Report for corresponding International Patent Application No. PCT/EP2023/080219, mailed Jan. 16, 2024, 4 pages (for informational purpose only).

*Primary Examiner* — Twyler L Haskins
*Assistant Examiner* — Akshay Trehan
(74) *Attorney, Agent, or Firm* — Viering, Jentschura & Partner mbB

(57) ABSTRACT

A pixel arrangement comprises a photodiode, a circuit node, a transfer transistor, an amplifier, a supply terminal and a reset transistor. The transfer transistor is coupled to the photodiode and to the circuit node. The amplifier is coupled to the circuit node. The reset transistor is coupled to the supply terminal and to the circuit node. In a reset phase, charge of the photodiode flows via the transfer transistor being set in a first conducting state and via the reset transistor to the supply terminal and further charge of the photodiode flows via the transfer transistor being set in a second conducting state and via the reset transistor to the supply terminal. A method for operating a pixel arrangement is also provided.

16 Claims, 8 Drawing Sheets

(51) Int. Cl.

| | |
|---|---|
| ***H04N 25/583*** | (2023.01) |
| ***H04N 25/59*** | (2023.01) |
| ***H04N 25/616*** | (2023.01) |
| ***H04N 25/77*** | (2023.01) |
| ***H04N 25/771*** | (2023.01) |
| ***H04N 25/772*** | (2023.01) |

(52) U.S. Cl.
CPC ........... *H04N 25/59* (2023.01); *H04N 25/616* (2023.01); *H04N 25/77* (2023.01); *H04N 25/771* (2023.01); *H04N 25/772* (2023.01)

(58) Field of Classification Search
CPC .... H04N 25/581; H04N 25/583; H04N 25/60; H04N 25/616; H04N 25/76–78; H04N 25/50–59
See application file for complete search history.

(56) References Cited

U.S. PATENT DOCUMENTS

| | | | | |
|---|---|---|---|---|
| 11,696,048 | B1 | 7/2023 | Rahman et al. | |
| 2009/0127438 | A1* | 5/2009 | Barbier | H04N 25/76 250/208.1 |
| 2015/0281683 | A1 | 10/2015 | Yaffe et al. | |
| 2018/0343405 | A1* | 11/2018 | Nishikido | H04N 25/589 |
| 2019/0230302 | A1 | 7/2019 | Lim et al. | |
| 2019/0373168 | A1 | 12/2019 | Balar et al. | |

FOREIGN PATENT DOCUMENTS

| | | | | |
|---|---|---|---|---|
| CN | 112670308 | A * | 4/2021 | H04N 25/771 |
| CN | 114302078 | A | 4/2022 | |
| DE | 102019113278 | A1 | 12/2019 | |
| WO | 2023018839 | A1 | 2/2023 | |

* cited by examiner

PIXEL ARRANGEMENT AND METHOD FOR OPERATING A PIXEL ARRANGEMENT

CROSS-REFERENCE TO RELATED APPLICATIONS

This application is a national phase of PCT/EP2023/080219 filed on Oct. 30, 2023, which claims priority to German Application No. 10 2022 129 039.5, which was filed on Nov. 3, 2022, the entire contents of both of which are incorporated herein by reference.

TECHNICAL FIELD

A pixel arrangement, an image sensor with a pixel arrangement and a method for operating a pixel arrangement are provided.

BACKGROUND

An image sensor typically comprises an array of pixel arrangements. The image sensor is configured to operate at high and low electromagnetic radiation. A high dynamic range for the conversion of electromagnetic radiation into an electrical signal is beneficial. The image sensor is used e.g. in the consumer, industrial and mobile market. Possible applications of the image sensor are augmented reality/virtual reality, abbreviated AR/VR, robotics and barcode scanner.

It is an object to provide a pixel arrangement, an image sensor with a pixel arrangement and a method for operating a pixel arrangement which are able to achieve a large dynamic range of signal conversion.

This object is achieved by the subject-matter of the independent claims. Further embodiments and developments are given in the dependent claims.

SUMMARY

In an embodiment, a pixel arrangement comprises a photodiode, a circuit node, a transfer transistor, an amplifier, a supply terminal and a reset transistor. The transfer transistor is coupled to the photodiode and to the circuit node. An input of the amplifier is coupled to the circuit node. The reset transistor is coupled to the supply terminal and to the circuit node.

In an embodiment of the pixel arrangement, in a reset phase, charge of the photodiode flows via the transfer transistor being set in a first conducting state and via the reset transistor to the supply terminal. Further on, in the reset phase, further charge of the photodiode flows via the transfer transistor being set in a second conducting state and via the reset transistor to the supply terminal.

Advantageously, by the flow of the charge and of the further charge, an overflow of charge is avoided in case of a situation with high light.

Advantageously, at a first point of time in the reset phase, the transfer transistor is in the first conducting state and, simultaneously, the reset transistor is in a conducting state at the first point of time to conduct charge of the photodiode to the supply terminal. At a second point of time in the reset phase, the transfer transistor is in the second conducting state and, simultaneously, the reset transistor is in the conducting state at the second point of time to conduct the further charge of the photodiode to the supply terminal.

In an embodiment of the pixel arrangement, in the reset phase, a controlled section of the transfer transistor has a first conductivity in the first conducting state and a second conductivity in the second conducting state.

The first conductivity may be higher than the second conductivity.

In an embodiment of the pixel arrangement, in the reset phase, the transfer transistor is set in the first conducting state by a first pulse of a transfer signal with a first voltage value and in the second conducting state by a second pulse of the transfer signal with a second voltage value.

The first and the second voltage values may be different.

In an embodiment of the pixel arrangement, the second pulse of the transfer signal is realized by a series of sub-pulses. Each of the sub-pulses has the second voltage value. Thus, the second pulse of the transfer signal includes at least one interruption.

In an example, the reset transistor is in the conducting state during at least a first sub-pulse of the series of sub-pulses. The reset phase includes the at least first sub-pulse of the series of sub-pulses.

In an example, the reset transistor is in the non-conducting state during at least a last sub-pulse of the series of sub-pulses. An exposure phase includes the at least a last sub-pulse of the series of sub-pulses.

In an embodiment of the pixel arrangement, the transfer transistor is set in a non-conducting state or in a very low conducting state in a period between the first pulse and the second pulse of the transfer signal. In the period between the first pulse and the second pulse of the transfer signal, the controlled section of the transfer transistor has a third conductivity. The second conductivity is higher than the third conductivity. In an example, the second conductivity is 10 times or 50 times higher than the third conductivity.

In an embodiment of the pixel arrangement, the reset transistor is set in a conducting state during the first pulse of the transfer signal, in a period between the first pulse of the transfer signal and the second pulse of the transfer signal and during a first part of the second pulse of the transfer signal.

In an embodiment of the pixel arrangement, in an exposure phase with a first exposure duration after the reset phase, charge of the photodiode is distributed via the transfer transistor to the circuit node. Thus, the circuit node is used to store the overflow charge of first exposure duration.

In an embodiment of the pixel arrangement, after the reset phase, the transfer transistor is set in a further conducting state by a third pulse of a transfer signal with a further voltage value. The second and the further voltage values are different.

In an example, the first and the further voltage values are equal and, thus, the first and the further conducting state are equal. Alternatively, the first and the further voltage values are different and, thus, the first and the further conducting state are different.

In an embodiment of the pixel arrangement, a collection duration starts with a falling edge of the first pulse of the transfer signal and ends with a falling edge of the third pulse of the transfer signal. The exposure phase is inside the collection duration. Whereas the exposure phase is for highlight condition, the collection duration is for lowlight condition. In lowlight condition, the exposure phase does not result in a flow of charges or a significant flow of charges from the photodiode to the circuit node; in lowlight condition, the charge collected in the collection duration on the photodiode exclusively or mainly flows to the circuit node during the third pulse of the transfer signal.

In an embodiment of the pixel arrangement, the pixel arrangement comprises a coupling transistor coupled to the circuit node.

In an embodiment of the pixel arrangement, in an exposure phase after the reset phase, charge of the photodiode is distributed via the transfer transistor and the coupling transistor to a second or a third capacitor of the pixel arrangement. In an example, the exposure phase is part of the collection duration. The exposure phase is nested inside the collection duration. A duration of the exposure phase is smaller than the collection duration.

In an embodiment of the pixel arrangement, in the exposure phase during a second part of the second pulse of the transfer signal, the reset transistor is set in a non-conducting state and the coupling transistor is set in a conducting state.

In an embodiment of the pixel arrangement, the third capacitor comprises a first electrode coupled via the reset transistor to the supply terminal and via the coupling transistor to the circuit node. In an example, the third capacitor and/or the coupling transistor are optional.

In an embodiment of the pixel arrangement, the pixel arrangement comprises a first capacitor, the second capacitor and a first and a second transistor. The first transistor is coupled to an output of the amplifier and to the first capacitor. The second transistor is coupled to the first transistor and to the second capacitor.

In an embodiment of the pixel arrangement, the coupling transistor is arranged between the circuit node and the second capacitor.

In an embodiment of the pixel arrangement, the amplifier generates an output voltage as a function of a voltage tapped at the circuit node. After the exposure phase in a first storage phase, the output voltage of the amplifier is stored in the second capacitor via the first transistor being set in a conducting state and via the second transistor being set in a conducting state.

In an embodiment of the pixel arrangement, after the first storage phase in a second storage phase, charge of the photodiode is provided via the transfer transistor being set in a third conducting state and the circuit node to the amplifier.

In an embodiment of the pixel arrangement, the output voltage of the amplifier is stored in the first capacitor via the first transistor being set in a conducting state.

In an embodiment of the pixel arrangement, a third conductivity of the transfer transistor in the third conducting state of the transfer transistor is equal to the first conductivity of the transfer transistor in the first conducting state of the transfer transistor.

In an embodiment, the pixel arrangement further comprises a reference potential terminal and a bias transistor coupled to the output of the amplifier and to the reference potential terminal.

In an embodiment of the pixel arrangement, the first capacitor comprises a first electrode coupled to a node between the first transistor and the second transistor and a second electrode coupled to the reference potential terminal.

The second capacitor comprises a first electrode coupled to the second transistor and a second electrode coupled to the reference potential terminal.

In an embodiment, the pixel arrangement further comprises a further amplifier, a column line and a select transistor. An input of the further amplifier is coupled to the second capacitor. The select transistor is coupled to the column line and to an output of the further amplifier.

In an embodiment, the pixel arrangement is made of silicon. The pixel arrangement comprises a silicon substrate. The photodiode is realized in the silicon substrate.

In an embodiment, an image sensor comprises an array of pixel arrangements.

In an embodiment, the image sensor is implemented as global shutter image sensor or rolling shutter image sensor.

In an embodiment, a method for operating a pixel arrangement comprises converting electromagnetic radiation into charge by a photodiode, and in a reset phase, conducting charge of the photodiode via a transfer transistor being set in a first conducting state, a circuit node and a reset transistor to a supply terminal, and conducting further charge of the photodiode via the transfer transistor being set in a second conducting state, the circuit node and the reset transistor to the supply terminal.

The transfer transistor is coupled to the photodiode and to the circuit node. The reset transistor is coupled to the circuit node and to the supply terminal.

In an embodiment of the method, an amplifier comprises an input coupled to the circuit node. An output of the amplifier is coupled via a first transistor to a first capacitor. A second transistor is coupled to the first transistor and to a second capacitor.

The pixel arrangement and the image sensor described above are particularly suitable for the method of operating a pixel arrangement. Features described in connection with the pixel arrangement and the image sensor can therefore be used for the method and vice versa.

In an example, the pixel arrangement implements a voltage domain HDR pixel with overflow and single barrier modulation. DR is the abbreviation for dynamic range. HDR is the abbreviation for high dynamic range.

In an example, the pixel arrangement is realized in a global shutter or rolling shutter product. The pixel arrangement provides a DR extension. The pixel arrangement is fabricated e.g. with a small pixel pitch. The pixel arrangement improves the limited dynamic range of a global shutter image sensor and the dark current. The lateral overflow technique is activated only for a short portion of the exposure time and allows much higher DR and lower dark current compared to other lateral overflow techniques. The higher DR and the lower dark current are achieved with same pixel architecture but with an amended pixel timing technique.

In an example, the current technique is compatible with all or other voltage domain pixels which have at least two storage capacitors. For example, a voltage domain global shutter sensor can implement the method; this is possible also in case the capacitors are arranged slightly differently as described above or shown below.

BRIEF DESCRIPTION OF THE DRAWINGS

The following description of figures of examples or embodiments may further illustrate and explain aspects of the pixel arrangement, the image sensor and the method for operating a pixel arrangement. Arrangements, devices and circuit blocks with the same structure and the same effect, respectively, appear with equivalent reference symbols. In so far as arrangements, devices and circuit blocks correspond to one another in terms of their function in different figures, the description thereof is not repeated for each of the following figures.

DETAILED DESCRIPTION

Figure 1A:
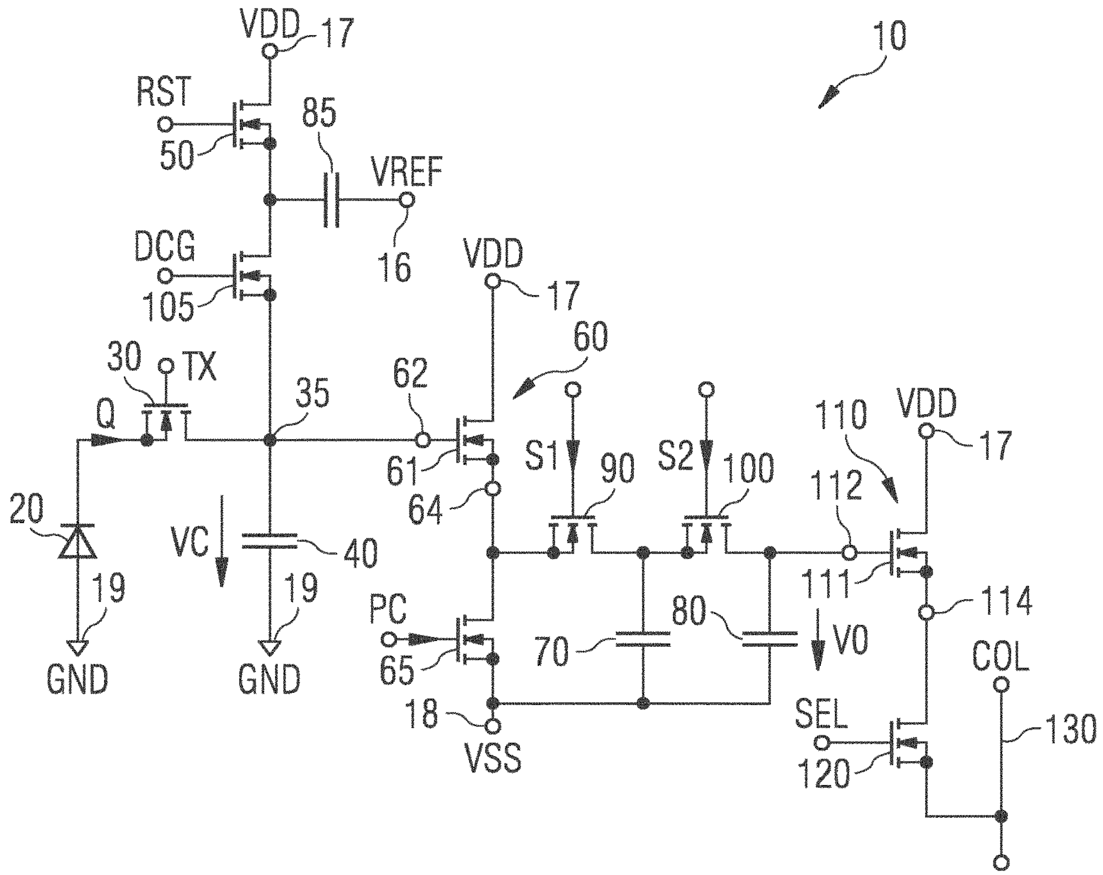
FIGS. 1A to 1G show an exemplary embodiment of a pixel arrangement, its signals and its characteristic.

FIG. 1A shows an exemplary embodiment of a pixel arrangement 10. The pixel arrangement 10 comprises a photodiode 20, a circuit node 35 and a transfer transistor 30 coupled to the photodiode 20 and to the circuit node 35. A controlled path of the transfer transistor 30 connects a first terminal of the photodiode 20 to the circuit node 35. The transfer transistor 30 can also be named transfer gate. The pixel arrangement 10 comprises an amplifier 60 with an input 62 coupled or connected to the circuit node 35. The circuit node 35 has a capacitance 40 which is e.g. a floating diffusion capacitance. The circuit node 35 is e.g. connected to or is equal with a first terminal or first electrode of the capacitance 40.

The pixel arrangement 10 comprises a first capacitor 70, a second capacitor 80, a first transistor 90 and a second transistor 100. The first and the second transistor 90, 100 can be named first and second switch. The first transistor 90 is coupled to an output 64 of the amplifier 60 and to the first capacitor 70. A controlled path of the first transistor 90 connects the output 64 of the amplifier 60 to a first electrode of the first capacitor 70. The second transistor 100 is coupled to the first transistor 90 and to the second capacitor 80. A controlled path of the second transistor 100 connects a terminal of the first transistor 90 to a first electrode of the second capacitor 80. Thus, the controlled path of the second transistor 100 connects the first electrode of the first capacitor 70 to the first electrode of the second capacitor 80.

Moreover, the pixel arrangement 10 comprises a supply terminal 17 and a reset transistor 50 coupled to the supply terminal 17 and to the circuit node 35. Furthermore, the pixel arrangement 10 comprises a coupling transistor 105 coupled to the circuit node 35. The reset transistor 50 is coupled to the coupling transistor 105 and to the supply terminal 17. The coupling transistor 105 is coupled to the circuit node 35 and to the reset transistor 50. Thus, a first terminal of the coupling transistor 105 is connected to the circuit node 35. The first terminal of the coupling transistor 105 is connected to the input 62 of the amplifier 60. The first terminal of the coupling transistor 105 is connected to the transfer transistor 30.

The pixel arrangement 10 further comprises a third capacitor 85 with a first electrode coupled via the reset transistor 50 to the supply terminal 17 and via the coupling transistor 105 to the circuit node 35. A second terminal of the coupling transistor 105 is connected to a first electrode of the third capacitor 85. The second terminal of the coupling transistor 105 is connected to a first terminal of the reset transistor 50. The first terminal of the reset transistor 50 is connected to the first electrode of the third capacitor 85. A second terminal of the reset transistor 50 is connected to the supply terminal 17. A second electrode of the third capacitor 85 is connected to a reference voltage terminal 16. The reference voltage terminal 16 is e.g. connected to the supply terminal 17, a reference potential terminal 18 of the pixel arrangement 10, a ground potential terminal 19 of the pixel arrangement 10 or an output of a voltage source (not shown).

The pixel arrangement 10 further comprises a column line 130 and a further amplifier 110. The further amplifier 110 has an input 112 and an output 114. The input 112 of the further amplifier 110 is coupled to the second capacitor 80. Thus, the input 112 of the further amplifier 110 is connected to the first electrode of the second capacitor 80 and to the second terminal of the second transistor 100. The output 114 of the further amplifier 110 is coupled to the column line 130.

The pixel arrangement 10 comprises a select transistor 120 coupled or connected to the column line 130 and to the output 114 of the further amplifier 110. The pixel arrangement 10 further comprises a bias transistor 65 coupled to the output 64 of the amplifier 60 and to the reference potential terminal 18.

The first electrode of the first capacitor 70 is coupled to a node between the first transistor 90 and the second transistor 100. A second electrode of the first capacitor 70 is coupled to the reference potential terminal 18. The first electrode of the second capacitor 80 is coupled to a node between the second transistor 100 and the input 112 of the further amplifier 110. A second electrode of the second capacitor 80 is coupled to the reference potential terminal 18.

A second terminal of the capacitance 40 is connected to the ground terminal 19. The reference potential terminal 18 is connected to the ground terminal 19 or is not connected to the ground terminal 19.

The amplifier 60 comprises an amplifier transistor 61 having a control terminal coupled to the input 62 of the amplifier 60. A first terminal of the amplifier transistor 61 is coupled to the supply terminal 17. A second terminal of the amplifier transistor 61 is coupled to the output 64 of the amplifier 60. The amplifier 60 is implemented as a source follower.

The capacitance 40 of the circuit node 35 comprises e.g. a capacitance of the control terminal of the amplifier transistor 61, a capacitance of a pn junction of a terminal of the transfer transistor 30 and a capacitance of a pn junction of the first terminal of the coupling transistor 105. Thus, parasitic capacitances of the transistors connected to the circuit node 35 may result in the capacitance 40 of the circuit node 35. The value of the capacitance 40 of the circuit node 35 may be the sum of the values of the parasitic capacitances of the transistors connected to the circuit node 35. Optionally, the pixel arrangement 10 comprises e.g. a capacitor connected to the circuit node 35; this capacitor may contribute to the capacitance 40.

For example, a capacitance of the first capacitor 70 and a capacitance of the second capacitor 80 are equal. The capacitance of the first capacitor 70 is e.g. higher than the value of the capacitance 40 of the circuit node 35. The capacitance of the second capacitor 80 is e.g. higher than the value of the capacitance 40 of the circuit node 35. A capacitance of the third capacitor 85 is e.g. higher than the value of the capacitance 40 of the circuit node 35. The first and the second capacitor 70, 80 are realized e.g. as metal-insulator-metal capacitor (abbreviated MIM capacitor) or as metal-insulator-semiconductor capacitor (abbreviated MIS capacitor). The third capacitor 85 is realized e.g. as MIM capacitor or as MIS capacitor.

The further amplifier 110 comprises a further amplifier transistor 111 having a control terminal coupled to the input 112 of the further amplifier 110. A first terminal of the further amplifier transistor 111 is coupled to the supply terminal 17. A second terminal of the further amplifier transistor 111 is coupled to the output 114 of the further amplifier 110. The further amplifier 110 is implemented as a source follower.

A supply voltage VDD is tapped at the supply terminal 17. A reference potential VSS is tapped at the reference potential terminal 18. The supply voltage VDD is positive with respect to the reference potential VSS. A ground potential GND is tapped at the ground terminal 19. The reference potential VSS and the ground potential GND have different or equal values. A reference voltage VREF is applied to the reference voltage terminal 16 and thus to the second electrode of the third capacitor 85.

A row driver (shown in FIG. 3A) is coupled to the control terminal of the transfer transistor 30, the control terminal of the coupling transistor 105, the control terminal of the reset transistor 50, the control terminal of the bias transistor 65, the control terminal of the first transistor 90, the control terminal of the second transistor 100 and the control terminal of the select transistor 120. The row driver provides a transfer signal TX to the transfer transistor 30, a coupling signal DCG to the coupling transistor 105, a reset signal RST to the reset transistor 50, a bias transistor signal PC to the bias transistor 65, a first control signal S1 to the first transistor 90, a second control signal S2 to the second transistor 100 and a select signal SEL to the select transistor 120. In case the reset signal RST sets the bias transistor 65 in a conducting state, the bias transistor 65 delivers a bias current for the amplifier 60.

The operation is explained using FIGS. 1B to 1G.

In an alternative embodiment, not shown, the reference potential terminal 18 is connected to the ground potential terminal 19. The ground potential GND and the reference potential VSS are equal.

In an alternative embodiment, not shown, the third capacitor 85 is omitted. The method described below can be used for a pixel arrangement 10 without the third capacitor 85.

In an alternative embodiment, not shown, the third capacitor 85 and the coupling transistor 105 are omitted. The controlled section of the coupling transistor 105 is replaced by a connection line. The method described below can be used for a pixel arrangement 10 also in this case.

Figure 1B:
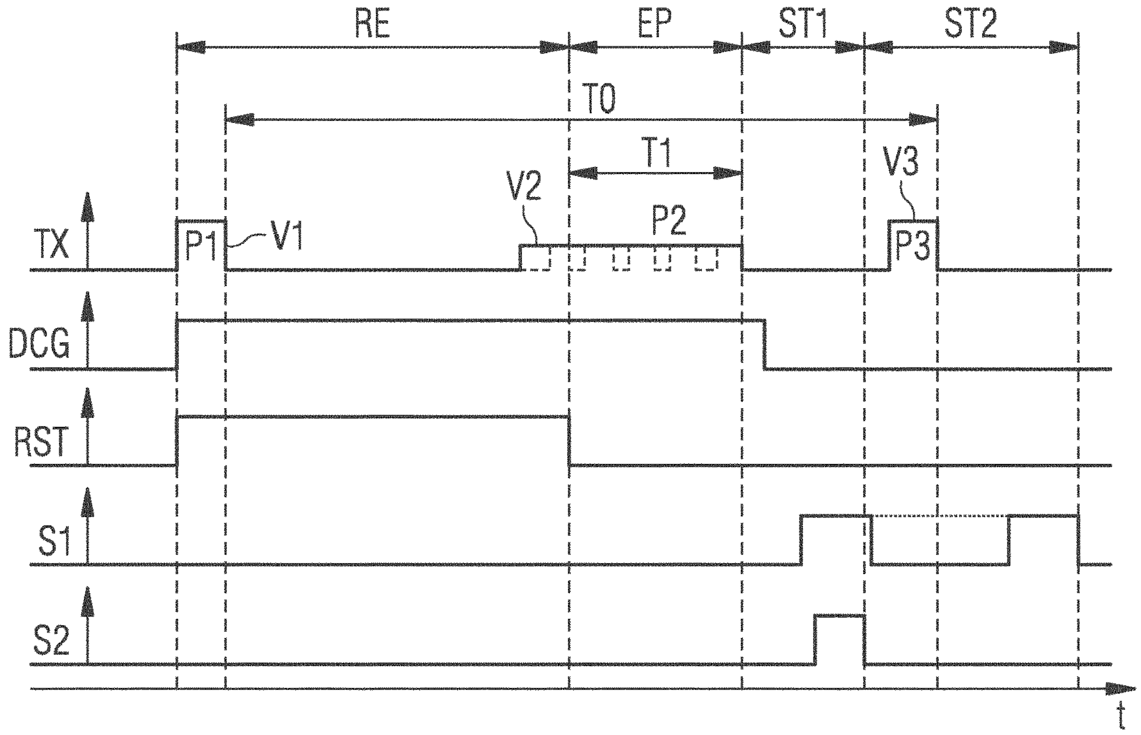

FIG. 1B shows an exemplary timing diagram performed by a pixel arrangement 10 which is shown e.g. in FIG. 1A. The following signals are shown as a function of a time t: The transfer signal TX, the coupling signal DCG, the reset signal RST, the first control signal S1 and the second control signal S2. The operation of the pixel arrangement 10 comprises a reset phase RE, an exposure phase EP, a first storage phase ST1 and a second storage phase ST2. The exposure phase EP follows the reset phase RE. The first storage phase ST1 follows the exposure phase EP. The second storage phase ST2 follows the first storage phase ST1.

A part of the reset phase RE, the complete first storage phase ST1 and a part of the second storage phase ST2 form a collection duration TO.

In the reset phase RE, charge Q of the photodiode 20 flows via the transfer transistor 30 being set in a first conducting state, via the coupling transistor 105 and via the reset transistor 50 to the supply terminal 17. After that, in the reset phase RE, further charge Q of the photodiode 20 flows via the transfer transistor 30 being set in a second conducting state, via the coupling transistor 105 and via the reset transistor 50 to the supply terminal 17. There is no charge flow or only a very low charge flow from the photodiode 20 to the circuit node 35 after the flow of the charge Q (e.g. resulting from a first pulse P1 of the transfer signal TX, as described below) and before the flow of the further charge (e.g. resulting from a second pulse P2 of the transfer signal TX).

In the reset phase RE, a controlled section of the transfer transistor 30 has a first conductivity in the first conducting state and a second conductivity in the second conducting state. The first conductivity is higher than the second conductivity.

In the reset phase RE, the transfer transistor 30 is set in the first conducting state by a first pulse P1 of the transfer signal TX with a first voltage value V1 and in the second conducting state by a second pulse P2 of the transfer signal TX with a second voltage value V2. The first and the second voltage values V1, V2 are different. The second voltage value V2 results in a higher barrier than the first voltage value V1. For example, V1>V2.

The transfer transistor 30 is set in a non-conducting state in a period between the first pulse P1 and the second pulse P2 of the transfer signal TX. The reset transistor 50 is set in a conducting state during the first pulse P1 of the transfer signal TX, in a period between the first pulse P1 of the transfer signal TX and the second pulse P2 of the transfer signal TX and during a first part of the second pulse P2 of the transfer signal TX.

Figure 2A:
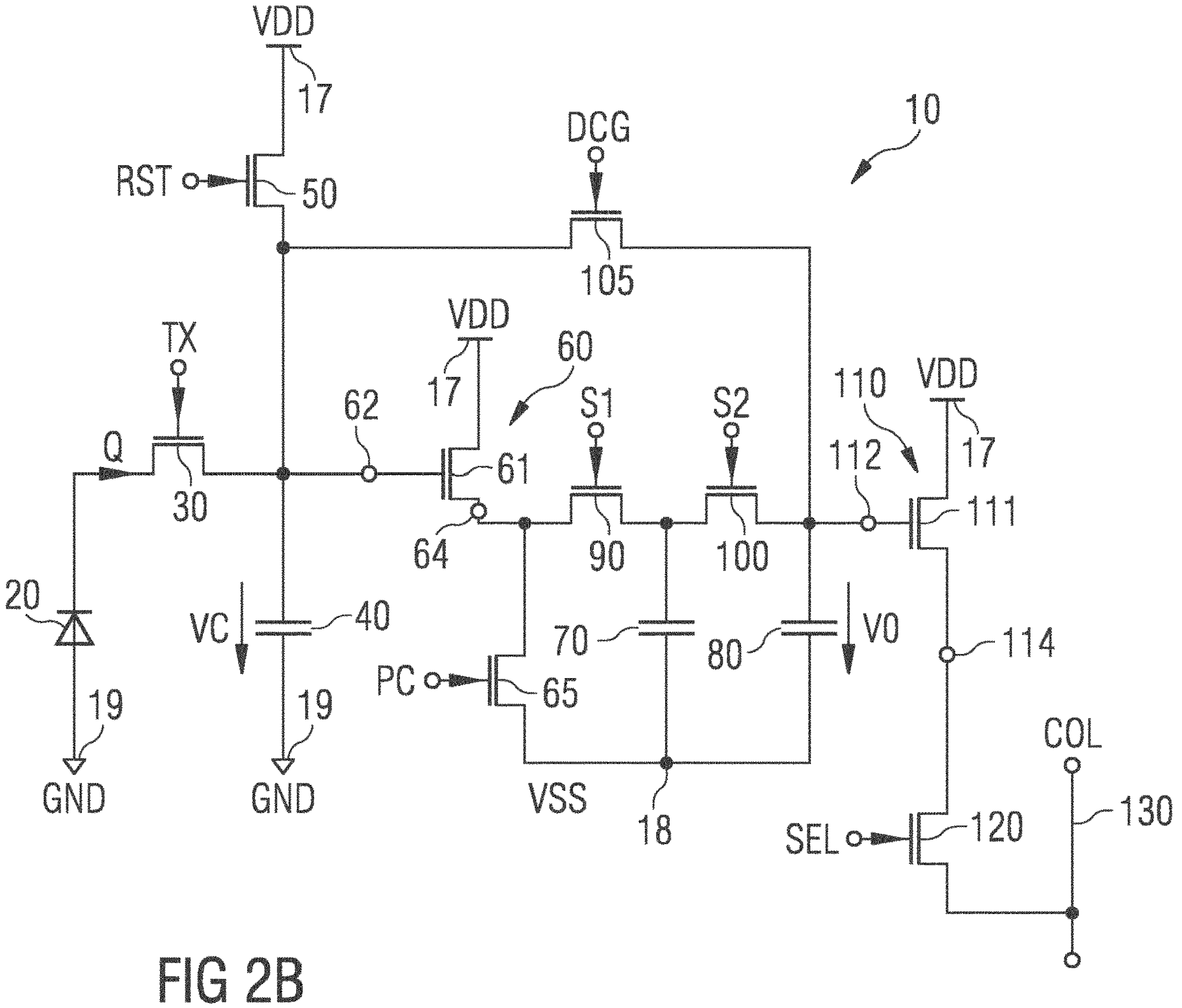
FIGS. 2A to 2E show a further exemplary embodiment of a pixel arrangement, its signals and its characteristic.

In the exposure phase EP after the reset phase RE, charge Q of the photodiode 20 is distributed via the transfer transistor 30 and the coupling transistor 105 to the third capacitor 85 (as shown in FIGS. 1A and 1B) or to the second capacitor 80 (as shown in FIG. 2A). The exposure phase EP has a first duration T1. The exposure phase EP starts with a falling edge of the reset signal RST and ends with a falling edge of the second pules P2 of the transfer signal TX.

A collection duration TO starts with a falling edge of the first pulse P1 of the transfer signal TX and ends with a falling edge of a third pulse P3 of the transfer signal TX. Charge Q generated by the photodiode 20 during the collection duration TO is used in the first and the second storage phase ST1, ST2 with the exception of the amount of charge which flows to the supply terminal 17 during the first part of the second pulse P2 of the transfer signal TX.

An exposure starts when the collection duration TO starts (after the first pulse P1 of the transfer signal TX goes low). The collection duration TO is realized as a total exposure duration. The first duration T1 which is the duration of the exposure phase EP is the short exposure duration. The first duration T1 is used for highlight. The collection duration TO is appropriate for lowlight. The reset period RE is used to collect strong overflow from the photodiode 20 and push it to the supply terminal 17. The third pulse P3 happens after the first storage phase ST1. If there is an overflow, the overflow is stored on the second capacitor 80 during the first storage phase ST1, e.g. together with the reset level. The reset level and optionally a signal from the exposure phase EP (if there is overflow) are used in the first storage phase ST1.

In the exposure phase EP during a second part of the second pulse P2 of the transfer signal TX, the reset transistor 50 is set in a non-conducting state and the coupling transistor 105 is set in a conducting state. The amplifier 60 generates an output voltage as a function of a capacitance voltage VC tapped at the circuit node 35.

After the exposure phase EP in the first storage phase ST1, the output voltage of the amplifier 60 is stored in the second capacitor 80 via the first transistor 90 being set in a conducting state and via the second transistor 100 being set in a conducting state. After the first storage phase ST1 in the second storage phase ST2, charge Q of the photodiode 20 is provided via the transfer transistor 30 being set in a third conducting state to the amplifier 60, and the output voltage of the amplifier 60 is stored in the first capacitor 70 via the first transistor 90 being set in the conducting state. The third conductivity in the third conducting state of the transfer transistor 30 is equal to or different from the first conductivity in the first conducting state of the transfer transistor 30.

In the second storage phase ST2, the second transistor 100 is in the non-conducting state. Before the end of the second storage phase ST2, the first transistor 90 is in the conducting state. Optionally, the first transistor 90 is continuously in the conducting state during the second storage phase ST2.

A method for operating a pixel arrangement 10 comprises continuously converting electromagnetic radiation into charge Q by the photodiode 20. In the reset phase RE, conducting charge Q of the photodiode 20 via the transfer transistor 30 being set in a first conducting state, the circuit node 35 (optional the coupling transistor 105) and the reset transistor 50 to the supply terminal 17, and additionally conducting further charge Q of the photodiode 20 via the transfer transistor 30 being set in a second conducting state, the circuit node 35 (optional the coupling transistor 105) and the reset transistor 50 to the supply terminal 17.

Optionally, the second pulse P2 of the transfer signal TX comprises at least one interruption, as indicated by dashed lines. The second pulse P2 is realized by a series of sub-pulses having the second voltage value V2. The number of sub-pulses may be 1 (in this case, there is no interruption of the second pulse P2), 2, 3 or 4. The number of sub-pulses may be larger than 0, 1, 2 or 3. In an example, each of the sub-pulses have the same pulse duration. In an example, each of the interruptions have the same interruption duration. The second pulse P2 comprises e.g. a series of periodically repeated sub-pulses.

In a lower dark current mode of the pixel arrangement 10, the interruptions are set. The second pulse P2 can be named overflow transfer signal. The first and the third pulse P1, P3 have a first voltage value V1 that may be named high voltage value TX high.

The overflow signal is only accounted for in the short exposure duration T1, earlier overflow is flushed away. Increase in the dynamic range DR is approximately:

$$\frac{Clg + Cfd}{Cfd}\frac{T0}{T1},$$

wherein Clg is a capacitance value of the third capacitor 85, Cfd is a capacitance value of the capacitance 40 and T0 and T1 are durations as defined in FIG. 1B.

Dark current of normal overflow mode is reduced by T0/T1 ratio (for example in the order of 10 to 20 times reduction).

During the operation in each of the phases, electromagnetic radiation is converted into charge Q by the photodiode 20.

In the reset phase RE, the transfer barrier is modified based on a system input: The transfer signal TX that is provided to the transfer transistor 30 controls a barrier between the photodiode 20 and the circuit node 35. Typically, between two pulses of the transfer signal TX, a voltage value of the transfer signal TX is selected such that the barrier for a flow of charge Q between the photodiode 20 and the circuit node 35 is high.

During the first pulse P1 of the transfer signal TX, the charge Q of the photodiode 20 is transferred to the supply terminal 17. Typically, the complete charge provided by the photodiode 20 up to the first pulse P1 of the transfer signal TX flows to the supply terminal 17. During the first pulse P1, the transfer transistor 30, the coupling transistor 105 and the reset transistor 50 are set in a conducting state. In other words, the photodiode 20 is emptied during the first pulse P1. This sets the start of a new exposure. At the falling edge of the first pulse P1 of the transfer signal TX, the collection duration TO starts. During the first part of the second pulse P2 of the transfer signal TX, the further charge Q of the photodiode 20 is transferred to the supply terminal 17, e.g. in a highlight condition. Only that portion of the charge at the photodiode 20 is transmitted to the supply circuit 17 which overcomes the barrier provided by the transfer transistor 30 having controlled by the second voltage value V2. In a lowlight condition, charge at the photodiode 20 does not overcome this barrier and is not affected.

In the first storage phase ST1, the charge Q generates the capacitance voltage VC at the input 62 of the amplifier 60. The first control signal S1 sets the first transistor 90 in a conducting state. The second control signal S2 has a short pulse for equalizing the voltages at the first and the second capacitor 70, 80. Thus, the amplified capacitance voltage is applied to the first and the second capacitor 90, 100.

In the second storage phase ST2, remaining charge Q is transferred via the transfer transistor 30 to the capacitance 40 of the circuit node 35: The third pulse P3 of the transfer signal TX is applied to the transfer transistor 30 for transferring further charge Q from the photodiode 20 to the capacitance 40 of the circuit node 35. The third pulse P3 of the transfer signal TX has a third voltage value V3. The second voltage value V2 results in a higher barrier than the third voltage value V3. In an example, V2<V3. In the second storage phase ST2, the coupling transistor 105 and the second transistor 100 remain in a non-conducting state.

In a first readout phase (not shown) after the second storage phase ST2, the second capacitor 80 is read out: An output voltage VO is tapped at the second capacitor 80. A first value of the output voltage VO is amplified by the further amplifier 110. In case the select transistor 120 is set in a conducting state, the amplified output voltage is provided as column signal COL to the column line 130 for digitization. A first digitized value is generated as a function of the first value of the output voltage VO, e.g. by an evaluation circuit (shown in FIG. 3A).

In a second readout phase (not shown) after the first readout phase, the first capacitor 70 is read out: The second transistor 100 is set in a conducting state. Thus, the voltages at the first capacitor 70 and at the second capacitor 80 equalize. After equalization, the voltage stored on the first capacitor 70 is read at the column line 130. In other words, the column signal COL is generated as a function of the voltage stored on the first capacitor 70. The first transistor 90 is set in a non-conducting state. Setting the first transistor 90 in a non-conducting state avoids that the previously stored voltage value on the first capacitor 70 is overwritten. The second value of the output voltage VO is amplified by the further amplifier 110. When the select transistor 120 is set in a conducting state in the second readout phase, the amplified output voltage is provided as column signal COL to the column line 130 for digitization. A second digitized value is generated as a function of the second value of the output voltage VO by the evaluation circuit.

After the second readout phase, a voltage of the first capacitor 70 or a digitized value of the voltage of the first capacitor 70 is subtracted from a voltage of the second capacitor 80 or a digitized value of the voltage of the second capacitor 80 (high conversion gain, abbreviated HCG): An output signal which represents an illumination of the photodiode 20 is a function of the first digitized value (resulting from the first storage phase ST1 and the first readout phase) and of the second digitized value (resulting from the second storage phase ST2 and the second readout phase). In an example, the first digitized value is subtracted from the second digitized value by the evaluation circuit.

A low sensitivity signal is stored on the second capacitor 80 and a high sensitivity signal is stored on the first capacitor 70. This achieves a good low-light performance at a small size of the pixel arrangement 10 by utilizing dual conversion gain and only three capacitors.

In an example, the first and the second storage phase ST1, ST2 are global storage phases and the first and the second readout phases are performed for each row separately. Therefore, there may be a time gap between the second storage phase EP2 and the first readout phase. High conversion gain (abbreviated HCG) is a correlated double sampling read (abbreviated CDS read), while low conversion gain (abbreviated LCG) is a differential double sampling read (abbreviated DDS read).

Figure 1C:
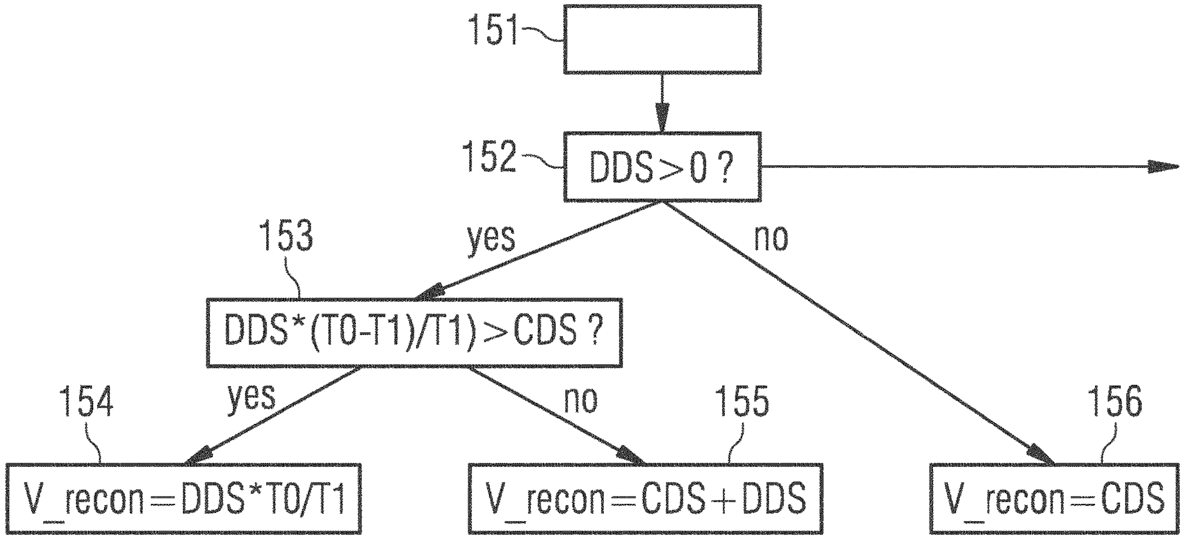

FIG. 1C shows an exemplary operation of the pixel arrangement 10 shown in FIGS. 1A and 1B. Differential double sampling, abbreviated DDS, is performed by providing reset level read during row readout minus the signal stored on the second capacitor 80. The reset level read is performed in a third readout phase which is the reset level readout for DDS. Correlated double sampling, abbreviated CDS, is performed by providing signal stored on the second capacitor 80 minus the signal stored on the first capacitor 70.

The column referred conversion gain (abbreviated CG) differences between DDS signal and CDS signal are optionally considered. Here for simplicity, the same conversion gain is assumed.

Block 151: Adjust DDS gain.

Block 152: The decision is made whether the value of the correlated double sampling read, abbreviated CDS value, is larger than a first threshold OR the differential double sampling read, abbreviated DDS values is larger than a second threshold.

$$CDS > \text{threshold 1 OR}$$

$$DDS > \text{threshold 2.}$$

Block 153: The decision is made whether the first barrier affected the photodiode 20; in other words, whether an overflow occurred during a first sub-pulse of the second pulse P2 of the transfer signal TX (the first sub-pulse realizes the first barrier).

Block 154: High-light state, each of the sub-pulses of the second pules P2 affected the photodiode 20 (an example is shown in FIG. 1F).

Block 155: Mid-light state or medium-light state, only the second barrier affected the photodiode 20. The second barrier is realized by a second sub-pulse of the second pulse P2. As can be seen in FIG. 1E, the second pulse P2 includes five sub-pulses and only from the second sub-pulse the photodiode 20 is affected. The number 5 of the sub-pulses is only an example.

Block 156: Low-light state, none of the barriers affected the photodiode 20, as can be seen in FIG. 1D.

Figure 1D:
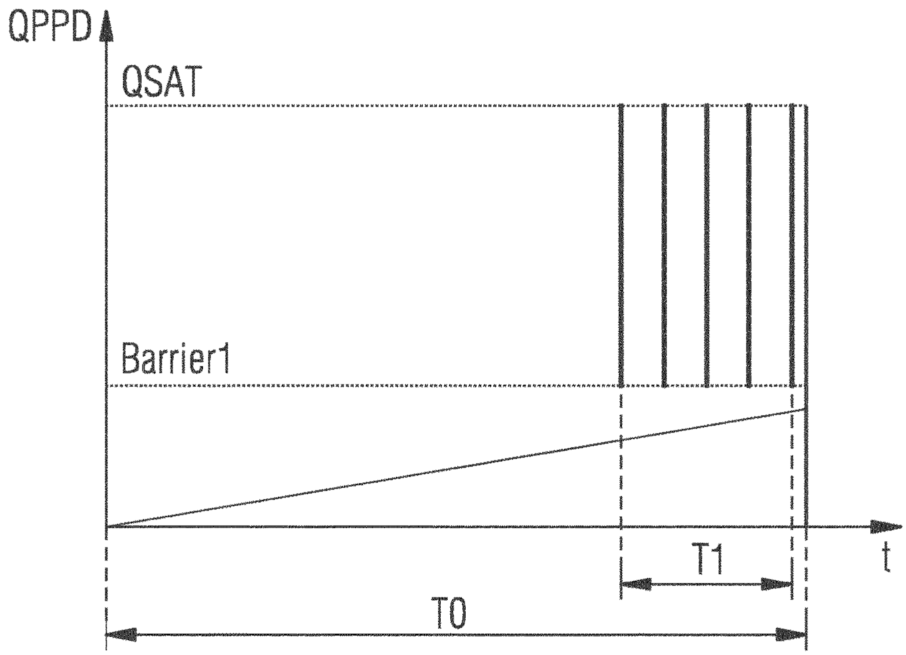
Figure 1E:
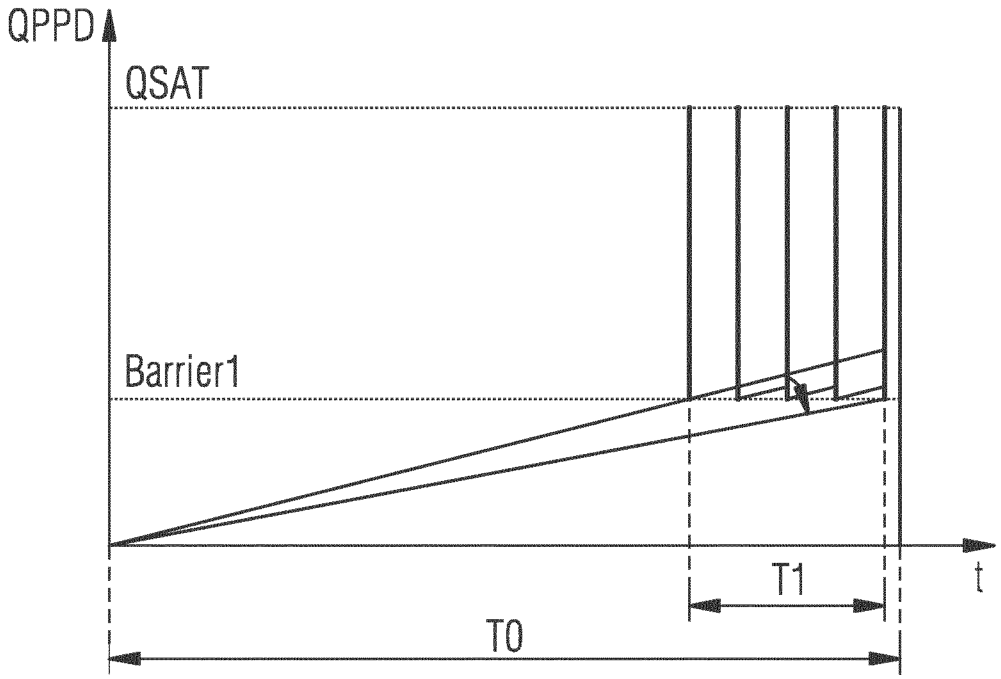
Figure 1F:
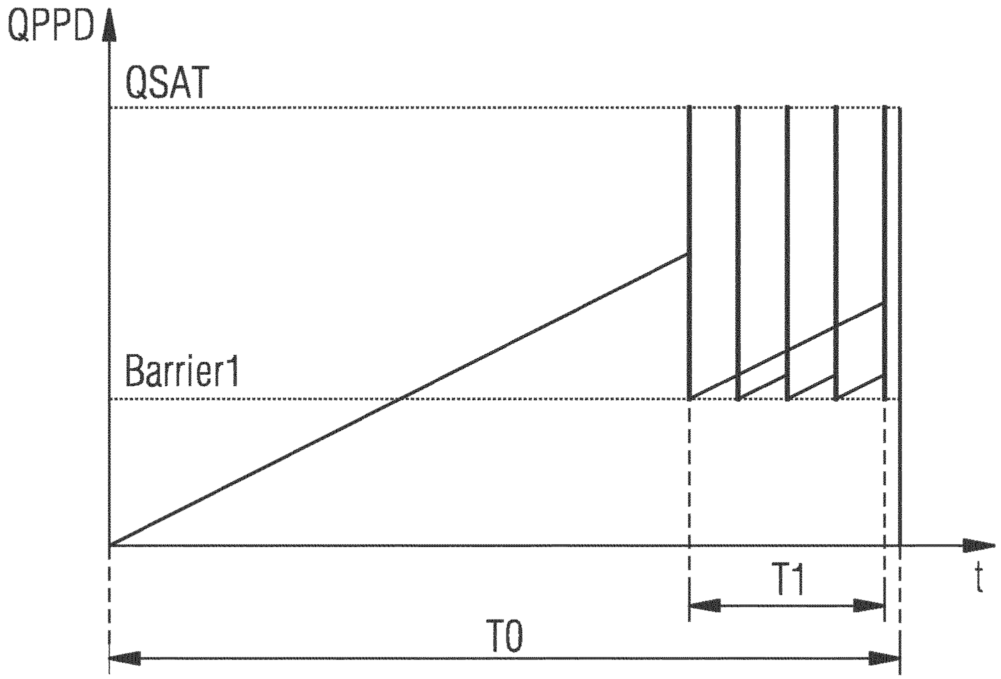

FIGS. 1D to 1F show exemplary characteristics of a pixel arrangement 10 which is shown e.g. in FIGS. 1A to 1C. In FIGS. 1D to 1F, a charge QPPD at the photodiode 20 is shown as a function of a time t. The time t is an exposure time.

In FIG. 1D, a low-light signal is shown. DDS=0, a reconstruction can be calculated as:

$$Qtot = CDS$$

In FIG. 1E, a mid-light signal or medium-light signal is shown.

$$DDS > 0 \text{ and } DDS\frac{t0 - t1}{t1} \leq CDS$$

The reconstruction can be calculated as:

$$Qtot = CDS + DDS$$

In FIG. 1F, a high-light signal is shown.

$$DDS\frac{t0 - t1}{t1} > CDS$$

The reconstruction can be calculated as:

$$Qtot = DDS\frac{t0}{t1}$$

Same reconstruction method is used as with single barrier modulation technique (different conversion gain, abbreviated CG, between CDS and DDS signal is not accounted here for simplicity).

Figure 1G:
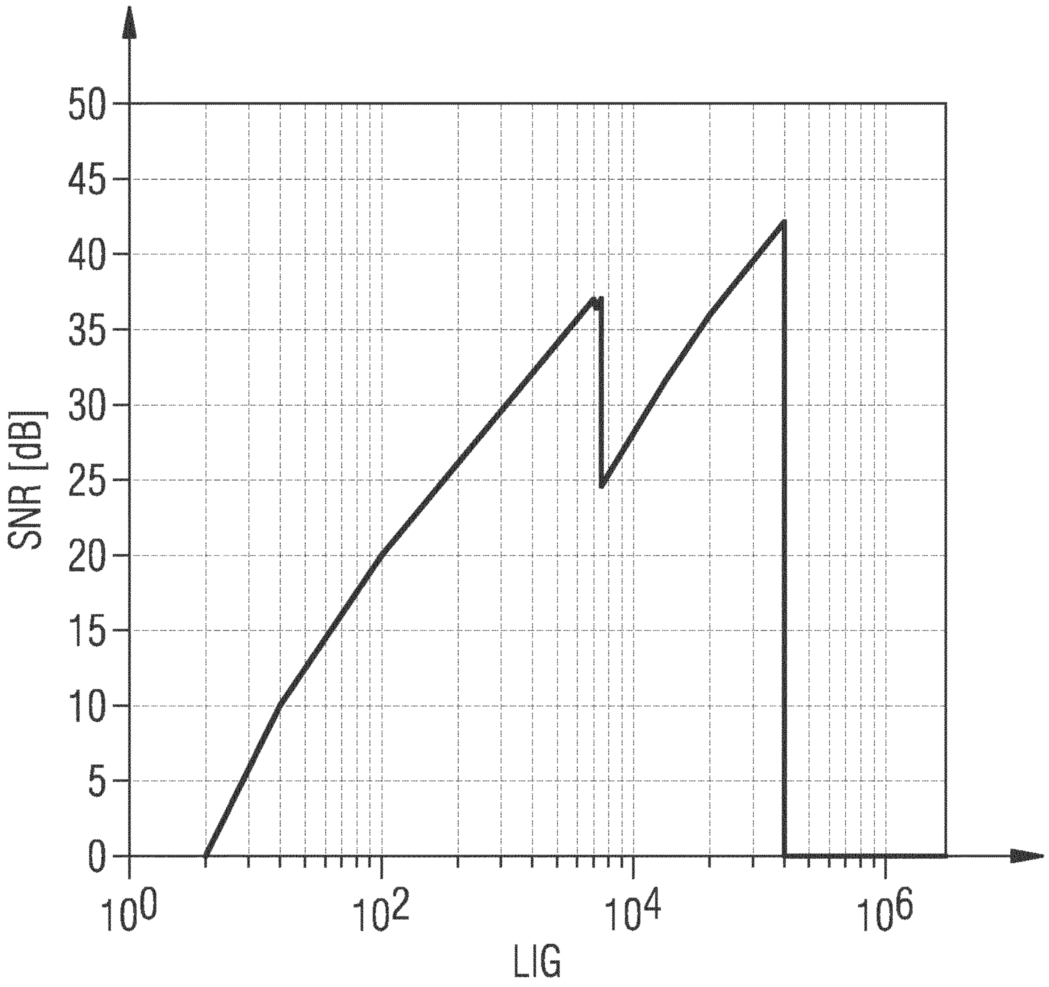

FIG. 1G show exemplary characteristics of a pixel arrangement 10 which is shown e.g. in FIGS. 1A to 1F. A signal noise ratio SNR is shown as a function of a light intensity LIG. The unit for the light intensity LIG is an electron ($e^-$). Thus, the light intensity LIG is given as number of electrons generated by the photodiode 20. As shown in FIG. 1G, the pixel arrangement implements an overflow HDR: example performance in single exposure mode.

The pixel arrangement 10 is less sensitive to floating-diffusion leakage or floating-diffusion dark-signal non-uniformity, abbreviated FD DSNU (e.g. T1=T0/9). This ratio means that the leakage time on the floating diffusion node (that is the circuit node 35) is reduced by the exposure ratio T1/T0. Less time to leak results in less voltage drop, hence less FD DSNU.

FIG. 2A shows another exemplary embodiment of a pixel arrangement 10. The coupling transistor 105 is arranged between the circuit node 35 and the second capacitor 80.

In the reset phase RE, charge Q of the photodiode 20 flows via the transfer transistor 30 being set in the first conducting state and via the reset transistor 50 to the supply terminal 17. After that, in the reset phase RE, further charge Q of the photodiode 20 flows via the transfer transistor 30 being set in the second conducting state and via the reset transistor 50 to the supply terminal 17. In the exposure phase EP after the reset phase RE, charge Q of the photodiode 20 is distributed via the transfer transistor 30 and the coupling transistor 105 to the second capacitor 80.

FIGS. 2B to 2E show exemplary characteristics of a pixel arrangement 10 which is shown e.g. in FIGS. 1A to 1G and 2A.

Figure 2B:
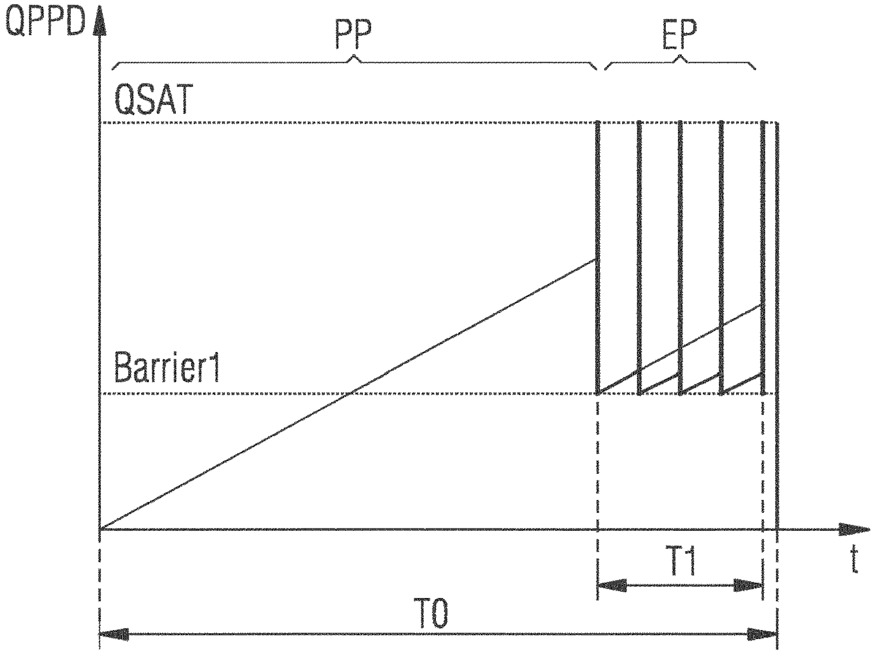

In FIG. 2B, the charge QPPD at the photodiode 20 is shown as a function of the time t. In the period PP, a pipeline operation is possible. Combination allows overflow on large cap and pipeline operation (overflow performed only on short exposure T1).

Figure 2C:
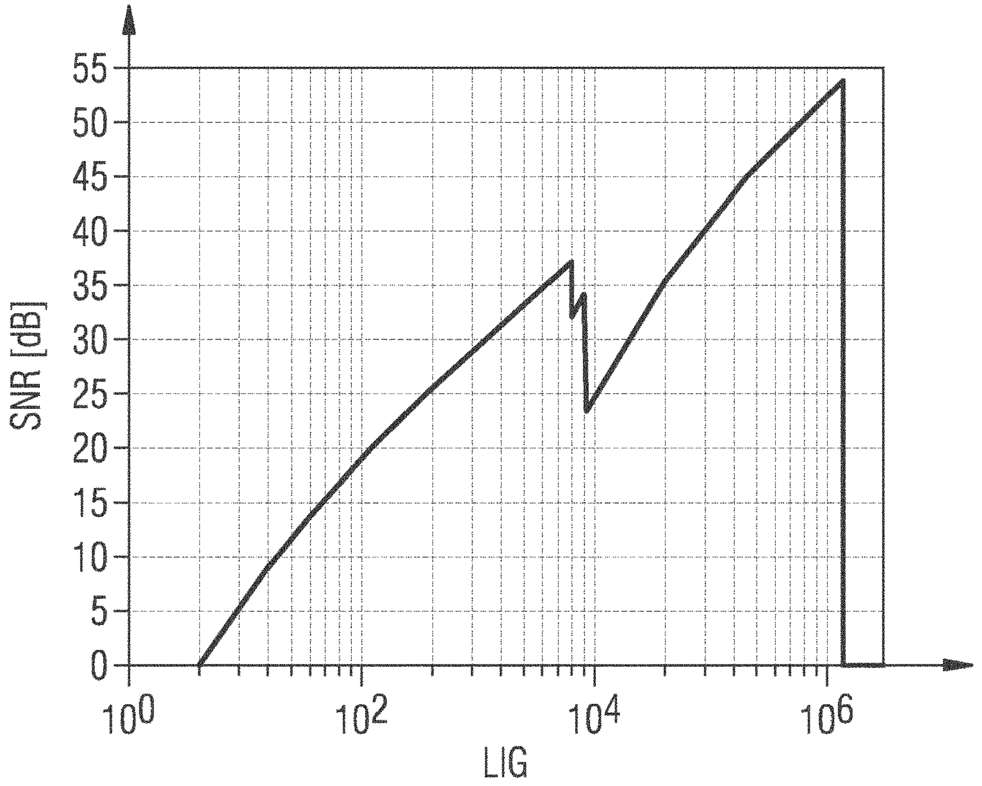
Figure 2D:
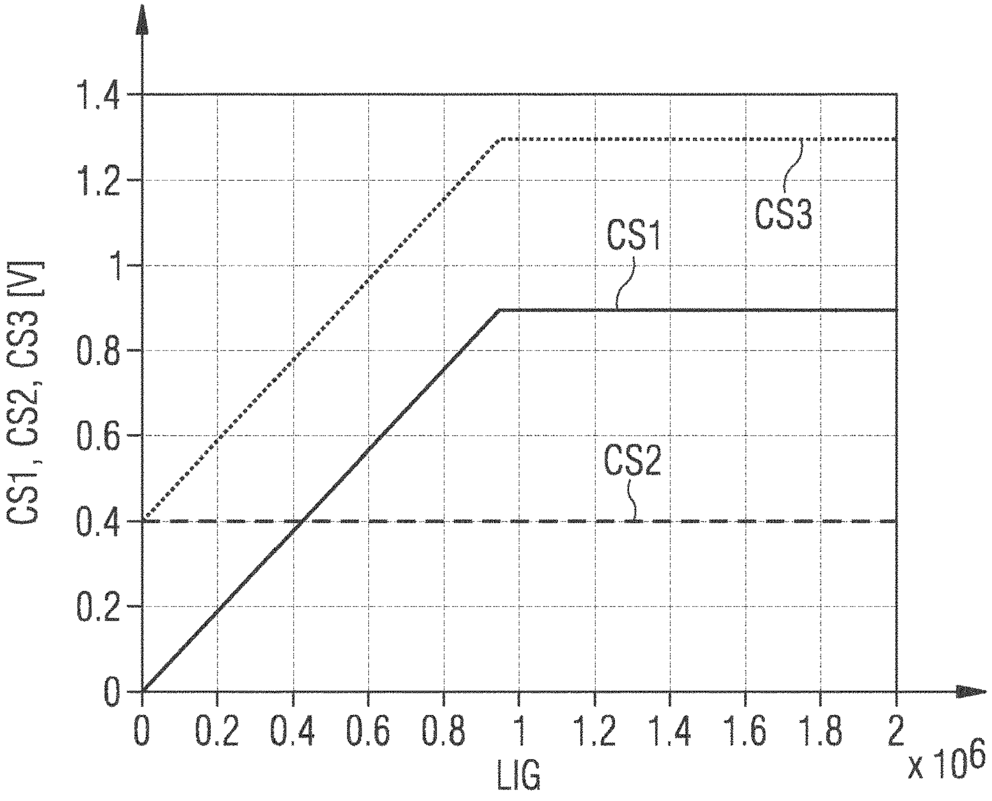
Figure 2E:
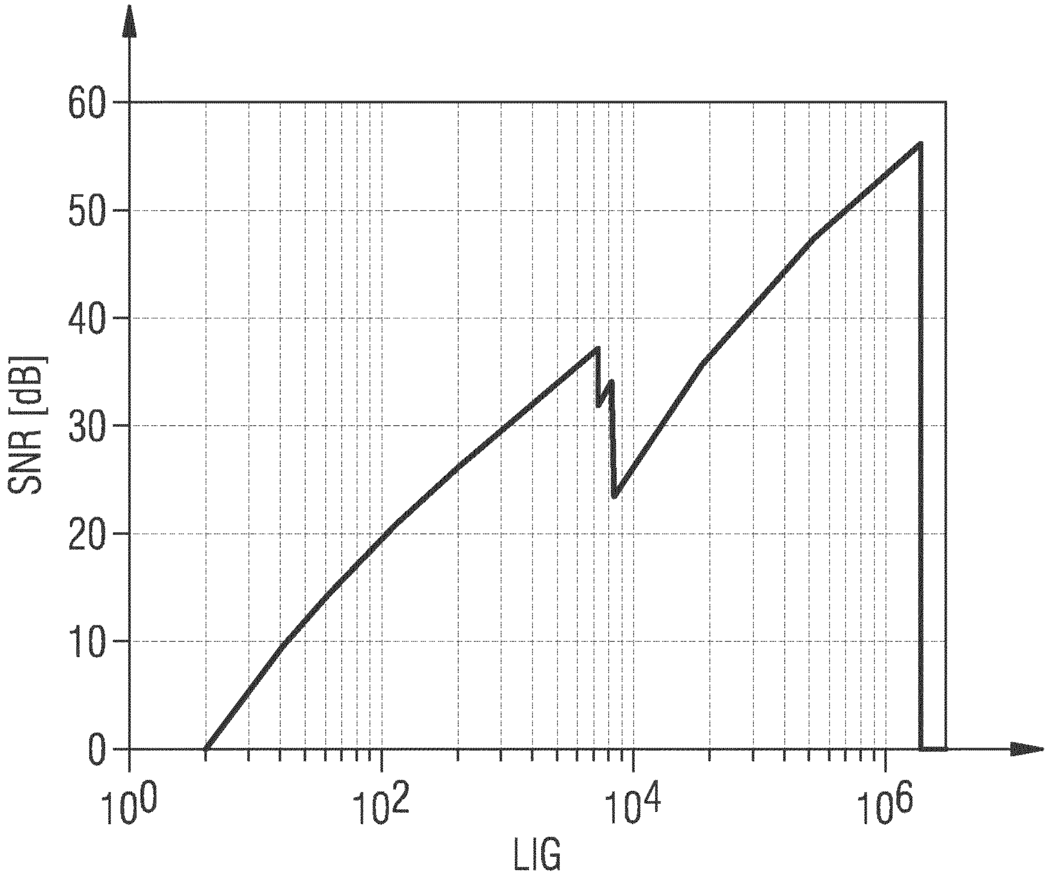

As illustrated in FIGS. 2C and 2D, combination allows overflow on large capacitor and pipeline operation (overflow performed only on short exposure T1).

In FIG. 2C, the signal to noise ratio SNR is shown as a function of the light intensity LIG.

In FIG. 2D, a column swing per signal as a function of the light intensity LIG is shown. CS1 is the column swing for DDS. CS2 is the column swing for CDS. CS3 is the total column swing. CS3=CS1+CS2 In FIG. 2E, results of one barrier and overflow are illustrated: combination with overflow on the first and the second capacitor 70, 80, dual exposure, soft reset and pipeline readout.

Figure 3A:
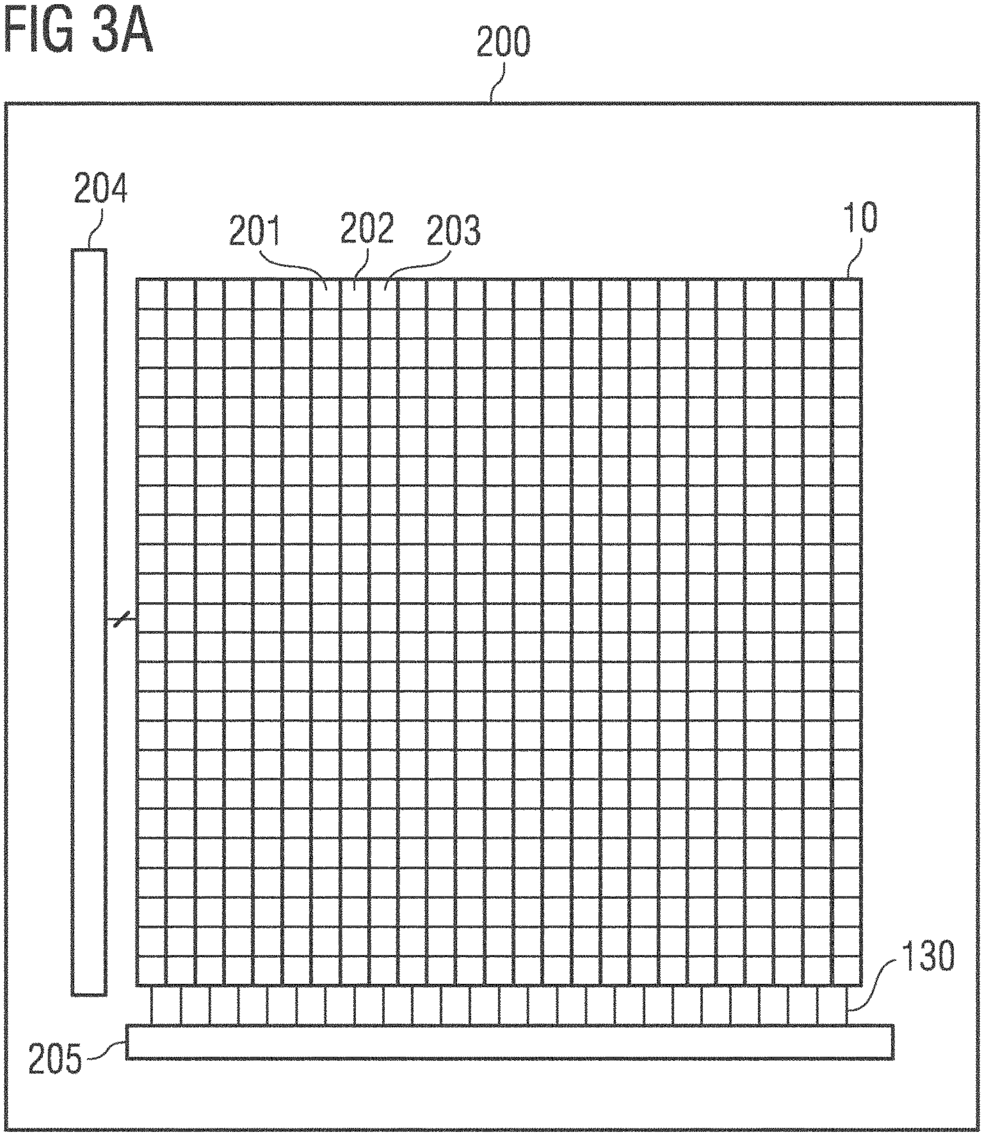
FIGS. 3A and 3B show an exemplary embodiment of an image sensor with a pixel arrangement and of details of a pixel arrangement.

FIG. 3A shows an exemplary embodiment of an image sensor 200 with a pixel arrangement 10 which is further development of the embodiments shown in FIGS. 1A to 1G and 2A to 2E. The image sensor 200 comprises an array of pixel arrangements 10 described above. The image sensor 200 is implemented e.g. as global or rolling shutter image sensor. Moreover, the image sensor 200 further comprises a row driver 204 that provides the transfer signal TX, the coupling signal DCG, the reset signal RST, the bias transistor signal PC, the first control signal S1, the second control signal S2 and the select signal SEL to the array of pixel arrangements 10. The row driver 204 provides these signals for each of the rows. The image sensor 200 comprises an evaluation circuit 205 for digitizing column signals COL at the column lines 130.

In the following text, CDS vs DDS in linearization of HDR signal is discussed:

CDS refers to the low light signal of the pixel, wherein a correlated double sampling is performed, i.e. the noise of the pixel FD reset operation is cancelled through reading the reset level and subtracting it from the signal level.

DDS refers to the highlight signal, wherein the reset level is read after the signal level. Reset level is read during row readout to avoid storing yet another reset level through MIM capacitors. DDS is much noisier than CDS but, at high light, noise is limited by the photon-shot noise. In this HDR technique, DDS is combined with the LCG mode, while CDS is combined with HCG mode. LCG is the abbreviation for low conversion gains and HCG is the abbreviation for high conversion gain.

To linearize the output of the HDR signal, the correct gains of CDS and DDS signals can be determined:

$$CDS_{out} = QCDS \cdot HGC \cdot GSF1 \frac{C1}{C1 + C2} GSF2$$

$$DDS_{out} = QCDS \cdot LGC \cdot GSF1 \cdot GSF2$$

wherein $CDS_{out}$ is a CDS signal at the output of the pixel arrangement 10 (that is equal to the column signal COL), $DDS_{out}$ is a DDS signal at the output of the pixel arrangement 10 (that is equal to the column signal COL), QCDS are the charges at circuit node 35, C1 is a capacitance value of the first capacitor 70, C2 is a capacitance value of the second capacitor 80, GSF1 is a gain of SF1 (60) and GSF2 is a gain of SF2 (110). Please note that the described method is one method to perform the linearization. There are also alternative methods available which are appropriate for the described pixel timing and pixel implementation.

For a linear HDR response, CDS and DDS signals use same gain; thus:

Keep CDS as is,

Linearize DDS $$DDS = DDS_{out} \frac{HGC \cdot GSF1 \frac{C1}{C1 + C2} GSF2}{LGC \cdot GSF1 \cdot GSF2} = DDS_{out} \frac{HGC}{LGC} \frac{C1}{C1 + C2}$$

-continued $$DDS \sim DDS_{out} \frac{HGC}{LGC} \frac{1}{2}$$

To summarize:

CDS signal used as discussed above is kept as the signal coming from the analog-to-digital converter, abbreviated ADC, ($CDS_{out}$).

DDS signal coming from the ADC receives a gain adaptation in digital domain prior to usage in processing:

$$DDS = DDS_{out} \frac{HGC}{LGC} \frac{C1}{C1 + C2} \sim DDS_{out} \frac{HGC}{LGC} \frac{1}{2}$$

All coefficients are settable through a register.

Figure 3B:
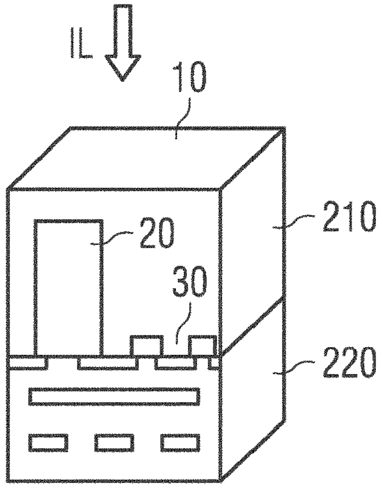

FIG. 3B shows details of a pixel arrangement 10 which is a further development of the embodiments shown in the FIGS. above. The pixel arrangement 10 comprises a semiconductor substrate. The semiconductor substrate is realized as a silicon substrate 210. The photodiode 20 is realized in the silicon substrate 210. Source electrodes and drain electrodes of one or more than one of the transistors 30, 50, 61, 65, 90, 100, 105, 111, 120 are also realized in the silicon substrate 210. Furthermore, the pixel arrangement 10 comprises a layer stack 220 that comprises e.g. control electrodes of the one or more than one of the transistors 30, 50, 61, 65, 90, 100, 105, 111, 120, conduction lines and the first and the second capacitor 70, 80.

The pixel arrangement 10 is realized as a backside illuminated pixel arrangement. An illumination IL is detected from the backside of the silicon substrate 210.

The invention is not limited to the description of the embodiments. Rather, the invention comprises each new feature as well as each combination of features, particularly each combination of features of the claims, even if the feature or the combination of features itself is not explicitly given in the claims or embodiments.

REFERENCE NUMERALS

10 pixel arrangement
16 reference voltage terminal
17 supply terminal
18 reference potential terminal
19 ground terminal
20 photodiode
30 transfer transistor
35 circuit node
40 capacitance
50 reset transistor
60 amplifier
61 amplifier transistor
62 input
64 output
65 bias transistor
70 first capacitor
80 second capacitor
85 third capacitor
90 first transistor
100 second transistor
105 coupling transistor
110 further amplifier
111 further amplifier transistor
112 input
114 output

120 select transistor
130 column line
151 to 156 block
200 image sensor
204 row driver
205 evaluation circuit
210 silicon substrate
220 layer stack
COL column signal
DCG coupling signal
EP exposure phase
GND ground potential
LIG light intensity
PC bias transistor signal
P1 to P3 pulse
Q charge
QPPD charge
RE reset phase
RST reset signal
SEL select signal
ST1 first storage phase
ST2 second storage phase
S1 first control signal
S2 second control signal
t time
TX transfer signal
T0, T1 duration
VC capacitance voltage
VDD supply voltage
VO output voltage
VREF reference voltage
VSS reference potential
V1 first voltage value
V2 second voltage value

The invention claimed is:

1. A pixel arrangement, comprising:
a photodiode;
a circuit node;
a transfer transistor coupled to the photodiode and to the circuit node; an amplifier with an input coupled to the circuit node, the amplifier being configured to generate an output voltage as a function of a voltage tapped at the circuit node;
a first capacitor and a second capacitor coupled to an output of the amplifier;
a supply terminal; and
a reset transistor coupled to the supply terminal and to the circuit node, wherein in a reset phase, charge of the photodiode flows via the transfer transistor being set in a first conducting state and via the reset transistor to the supply terminal, and
wherein in the reset phase, further charge of the photodiode flows via the transfer transistor being set in a second conducting state and via the reset transistor to the supply terminal,
wherein the transfer transistor is set in the first conducting state by a first pulse of a transfer signal with a first voltage value and in the second conducting state by a second pulse of the transfer signal with a second voltage value, wherein the first and the second voltage values are different,
wherein in an exposure phase with a first exposure duration after the reset phase, charge of the photodiode is distributed via the transfer transistor to the circuit node,
wherein after the exposure phase in a first storage phase, the output voltage of the amplifier is stored in the second capacitor,
wherein after the first storage phase in a second storage phase, charge of the photodiode is provided via the transfer transistor,
wherein the output voltage of the amplifier is stored in the first capacitor.

2. The pixel arrangement of claim 1,
wherein in the reset phase, a controlled section of the transfer transistor has a first conductivity in the first conducting state and a second conductivity in the second conducting state, and
wherein the first conductivity is higher than the second conductivity.

3. The pixel arrangement of according to claim 1, wherein the transfer transistor is set in a non-conducting state in a period between the first pulse and the second pulse.

4. The pixel arrangement of claim 1, wherein the reset transistor is set in a conducting state during the first pulse of the transfer signal, in a period between the first pulse of the transfer signal and the second pulse of the transfer signal and during a first part of the second pulse of the transfer signal.

5. The pixel arrangement of claim 1, wherein after the reset phase, the transfer transistor is set in a further conducting state by a third pulse of a transfer signal with a further voltage value,
wherein the second and the further voltage values are different, and
wherein a collection duration starts with a falling edge of the first pulse of the transfer signal and ends with a falling edge of the third pulse of the transfer signal.

6. The pixel arrangement of claim 1,
wherein the pixel arrangement comprises a coupling transistor coupled to the circuit node, and
wherein in the exposure phase with the first exposure duration after the reset phase, charge of the photodiode is distributed via the transfer transistor and the coupling transistor to a second capacitor of the pixel arrangement or to a third capacitor of the pixel arrangement.

7. The pixel arrangement of claim 6,
wherein in the exposure phase with the first exposure duration during a second part of the second pulse of the transfer signal, the reset transistor is set in a non-conducting state and the coupling transistor is set in a conducting state.

8. The pixel arrangement of claim 6,
wherein the third capacitor comprises a first electrode coupled via the reset transistor to the supply terminal and via the coupling transistor to the circuit node.

9. The pixel arrangement of claim 6,
wherein the pixel arrangement further comprises:
a reference potential terminal; and
a bias transistor coupled to the output of the amplifier and to the reference potential terminal,
wherein the first capacitor comprises:
a first electrode coupled to a node between the first transistor and the second transistor; and
a second electrode coupled to the reference potential terminal, and
wherein the second capacitor comprises:
a first electrode coupled to the second transistor; and
a second electrode coupled to the reference potential terminal.

10. The pixel arrangement of claim 6, further comprising:
a further amplifier having an input coupled to the second capacitor; a column line; and a select transistor coupled to the column line and to an output of the further amplifier.

11. The pixel arrangement of claim 1, further comprising:

a first transistor coupled to an output of the amplifier and to the first capacitor, and a second transistor coupled to the first transistor and to the second capacitor.

12. The pixel arrangement of claim 11, wherein the coupling transistor is arranged between the circuit node and the second capacitor.

13. The pixel arrangement of claim 1, wherein the transfer transistor is configured that a third conductivity in the third conducting state of the transfer transistor is equal to the first conductivity in the first conducting state.

14. The pixel arrangement of claim 1, wherein the second pulse of the transfer signal comprises two sub-pulses having the second voltage value, interruptions being arranged between the sub-pulses.

15. An image sensor, comprising an array of pixel arrangements, the pixel arrangement comprising:

a photodiode;

a circuit node;

a transfer transistor coupled to the photodiode and to the circuit node;

an amplifier with an input coupled to the circuit node, the amplifier being configured to generate an output voltage as a function of a voltage tapped at the circuit node;

a first capacitor and a second capacitor coupled to an output of the amplifier;

a supply terminal; and a reset transistor coupled to the supply terminal and to the circuit node, wherein in a reset phase, charge of the photodiode flows via the transfer transistor being set in a first conducting state and via the reset transistor to the supply terminal, wherein in the reset phase, further charge of the photodiode flows via the transfer transistor being set in a second conducting state and via the reset transistor to the supply terminal, wherein the transfer transistor is set in the first conducting state by a first pulse of a transfer signal with a first voltage value and in the second conducting state by a second pulse of the transfer signal with a second voltage value, wherein the first and the second voltage values are different, wherein in an exposure phase with a first exposure duration after the reset phase, charge of the photodiode is distributed via the transfer transistor to the circuit node, wherein after the exposure phase in a first storage phase, the output voltage of the amplifier is stored in the second capacitor, wherein after the first storage phase in a second storage phase, charge of the photodiode is provided via the transfer transistor, wherein the output voltage of the amplifier is stored in the first capacitor, wherein the image sensor is implemented as global shutter image sensor or as rolling shutter image sensor.

16. A method for operating a pixel arrangement, comprising:

converting electromagnetic radiation into charge by a photodiode;

in a reset phase, conducting charge of the photodiode via a transfer transistor being set in a first conducting state, a circuit node and a reset transistor to a supply terminal, and conducting further charge of the photodiode via the transfer transistor being set in a second conducting state, the circuit node and the reset transistor to the supply terminal, wherein the second conducting state is at least once interrupted, wherein the transfer transistor is coupled to the photodiode and to the circuit node, wherein the reset transistor is coupled to the circuit node and to the supply terminal, wherein in an exposure phase with a first exposure duration after the reset phase, charge of the photodiode is distributed via the transfer transistor to the circuit node, wherein after the exposure phase in a first storage phase, the output voltage of an amplifier is stored in a second capacitor, the amplifier being configured to generate an output voltage as a function of a voltage tapped at the circuit node, wherein after the first storage phase in a second storage phase, charge of the photodiode is provided via the transfer transistor, wherein the output voltage of the amplifier is stored in a first capacitor.

* * * * *